US009466418B2

(12) United States Patent
Georgakopoulos et al.

(10) Patent No.: US 9,466,418 B2
(45) Date of Patent: Oct. 11, 2016

(54) MULTI-BAND AND BROADBAND WIRELESS POWER TRANSFER THROUGH EMBEDDED GEOMETRIC CONFIGURATIONS

(71) Applicants: Stavros Georgakopoulos, Boca Raton, FL (US); Manos Tentzeris, Atlanta, GA (US); Olutola Jonah, Miami, FL (US)

(72) Inventors: Stavros Georgakopoulos, Boca Raton, FL (US); Manos Tentzeris, Atlanta, GA (US); Olutola Jonah, Miami, FL (US)

(73) Assignees: Gerogia Tech Research Corporation, Atlanta, GA (US); The Florida International University Board of Trustees, Miami, FL (US)

( * ) Notice: Subject to any disclaimer, the term of this patent is extended or adjusted under 35 U.S.C. 154(b) by 543 days.

(21) Appl. No.: 13/916,200

(22) Filed: Jun. 12, 2013

(65) Prior Publication Data

US 2013/0328410 A1 Dec. 12, 2013

Related U.S. Application Data

(60) Provisional application No. 61/658,596, filed on Jun. 12, 2012, provisional application No. 61/658,636, filed on Jun. 12, 2012, provisional application No. 61/662,674, filed on Jun. 21, 2012.

(51) Int. Cl.
*H01F 27/42* (2006.01)
*H01F 37/00* (2006.01)
(Continued)

(52) U.S. Cl.
CPC ............ *H01F 38/14* (2013.01); *H01F 27/006* (2013.01)

(58) Field of Classification Search
CPC .......... H02J 5/005; H02J 7/025; H02J 17/00; H02J 7/007; H02J 7/0052; H02J 2007/0096; H02J 5/00; H02J 7/00; H02J 7/345; H02J 2007/0039; H02J 2007/0059; H02J 2007/10; H02J 7/0004; H02J 7/00277
USPC ........................................................ 307/104
See application file for complete search history.

(56) References Cited

U.S. PATENT DOCUMENTS 7,741,734 B2 * 6/2010 Joannopoulos ....... B60L 11/182 307/104
8,400,019 B2 3/2013 Joannopoulos et al.
(Continued)

OTHER PUBLICATIONS

Sample et al. "Analysis, Experimental Results, and Range Adaptation of Magnetically Coupled Resonators for Wireless Power Transfer"; IEEE Transactions on Industrial Electronics, vol. 58, No. 2, Feb. 2011.
(Continued)

*Primary Examiner* — Jared Fureman
*Assistant Examiner* — Esayas Yeshaw
(74) *Attorney, Agent, or Firm* — Bryan W. Bockhop; Bockhop Intellectual Property Law LLC

(57) ABSTRACT

A wireless power transmission system includes first source conductor that generates a first electromagnetic near field in response to a power source. A first source element resonates in response to excitation from the first source conductor. A second resonant source element resonates in response to excitation from the first source conductor. A first resonant load element resonates in response to excitation from the first resonant source element. The first resonant load element generates a fluctuating field when resonating. A second resonant load element resonates at the second resonant frequency in response to excitation from the second resonant source element. The second resonant load element generates a fluctuating field when resonating. A first load element generates a first current applied to a first load in response to resonance in the first resonant load element and the second resonant load element.

17 Claims, 9 Drawing Sheets

(51) Int. Cl.
*H01F 38/00* (2006.01)
*H01F 38/14* (2006.01)
*H01F 27/00* (2006.01)

(56) References Cited

U.S. PATENT DOCUMENTS

| | | | | |
|---|---|---|---|---|
| 8,421,274 | B2 * | 4/2013 | Sun | H04B 5/0037 307/104 |
| 9,024,481 | B2 * | 5/2015 | Komiyama | H02J 5/005 307/104 |
| 2009/0242407 | A1 * | 10/2009 | Shiga | C02F 1/48 204/557 |
| 2011/0298294 | A1 * | 12/2011 | Takada | B60L 11/182 307/104 |
| 2012/0001593 | A1 * | 1/2012 | Di Guardo | H02J 7/025 320/108 |
| 2012/0153739 | A1 * | 6/2012 | Cooper | H02J 7/025 307/104 |
| 2012/0161529 | A1 * | 6/2012 | Kamata | H02J 17/00 307/99 |
| 2012/0161537 | A1 * | 6/2012 | Kamata | H02J 17/00 307/104 |

OTHER PUBLICATIONS

Endo et al. "Proposal for a new resonance adjustment method in magnetically coupled resonance type wireless power transmission"; Microwave Workshop Series on Innovative Wireless Power Transmission: Technologies, Systems, and Applications (IMWS), 2012 IEEE MTT-S International; IEEE; May 10-11, 2012.

Zhang et al. "Wireless Power Delivery for Wearable Sensors and Implants in Body Sensor Networks"; 32nd Annual International Conference of the IEEE EMBS Buenos Aires, Argentina, Aug. 31-Sep. 4, 2010.

Notification of Related Application: The following US Patent Applications, naming common inventors and commonly owned, disclose related subject matter: U.S. Appl. No. 13/916,121, filed Jun. 12, 2013; U.S. Appl. No. 13/916,168, filed Jun. 12, 2013; and U.S. Appl. No. 13/916,200, filed Jun. 12, 2013.

* cited by examiner

MULTI-BAND AND BROADBAND WIRELESS POWER TRANSFER THROUGH EMBEDDED GEOMETRIC CONFIGURATIONS

CROSS-REFERENCE TO RELATED APPLICATION(S)

This application claims the benefit of U.S. Provisional Patent Application Ser. No. 61/658,596, filed Jun. 12, 2012, the entirety of which is hereby incorporated herein by reference. This application also claims the benefit of U.S. Provisional Patent Application Ser. No. 61/658,636, filed Jun. 12, 2012, the entirety of which is hereby incorporated herein by reference. This application also claims the benefit of U.S. Provisional Patent Application Ser. No. 61/662,674, filed Jun. 12, 2012, the entirety of which is hereby incorporated herein by reference.

BACKGROUND OF THE INVENTION

1. Field of the Invention

The present invention relates to power transfer devices and, more specifically, to a wireless power transfer device.

2. Description of the Related Art

Wireless power transfer devices can be used to transfer power from a source to a load without requiring a wired connection between the two. They can also be used to transfer data wirelessly as well. Such devices are commonly used in situations where it is either impractical to use wired connections or potentially unsafe to do so. For example, many electric tooth brush systems use wireless power transfer to recharge the batteries in the tooth brush. Since the elements of the system are covered in non-conductive plastic, there is little chance of electric shock with such systems.

Modern digital devices, such as smart phones, tablets and the like, require frequent recharging. However, most such systems require the digital device to be plugged into a recharger. Because doing so is somewhat inconvenient, users often forget to recharge their devices.

Numerous wireless power transfer methods have been proposed and studied in the past for various applications. Specifically, wireless power transfer has been achieved using near-field coupling in several applications such as, RFID tags, telemetry and implanted medical devices. In addition, certain inductive coupling techniques have been reported to exhibit high power transfer efficiencies (on the order of 90%) for very short distances (1-3 cm). However, the efficiency of such techniques drops drastically for longer distances.

One type of wireless power transfer system employs a strongly coupled magnetic resonance (SCMR) method. A typical SCMR system employs an inductive transmitter loop and a spaced apart inductive receiver loop. Each loop resonates as substantially the same frequency. An alternating current source is used to excite the transmitter loop, which when resonating causes the receiver loop to resonate. The receiver loop is inductively coupled to a load and transfers power to the load as a result of its resonating.

Loop misalignment can result is a substantial decrease in efficiency. Conventional SCMR systems tend to be highly sensitive to the alignment between transmitter loop and receiver loop. The loops can be angularly misaligned, in which the loops exist on non-parallel planes. A greater angular difference in the planes results in lower power transfer efficiency. The loops may also be laterally misaligned, in which the loops may be parallel to each other but are on laterally spaced apart axes. Again, a greater distance between the axes results in a lower power transfer efficiency.

One approach to correcting SCMR's angular misalignment sensitivity employs tuning circuits. This method is generally not able to maintain high efficiency above 60° of misalignment. Also, tuning circuits add to the complexity of SCMR systems and they cannot compensate for large angular and radial misalignments as they cannot recover the lost flux density between transmitter and receiver. However, tuning circuits can be useful for compensating the effects of variable axial distance between the transmitter and the receiver.

Many digital devices require frequent data updating. One convenient time to update a digital device is during periods of non-use, such as when the device is being recharged.

Therefore, there is a need for a convenient wireless power transfer system that is efficient at longer distances.

Therefore, there is a need for a convenient wireless power transfer system that is efficient when the transmitter and the receiver are misaligned.

Therefore, there is a need for a convenient wireless power transfer system that facilitates both power transfer and data transfer simultaneously.

SUMMARY OF THE INVENTION

The disadvantages of the prior art are overcome by the present invention which, in one aspect, is a wireless power transmission system for transmitting power from at least one power source to at least one load. A first source conductor is configured to generate a first periodically fluctuating electromagnetic near field in response to an alternating current received from the power source. A first resonant source element is configured to resonate with an oscillating current at a first resonant frequency in response to excitation from the first periodically fluctuating electromagnetic near field generated by the first source conductor. At least one second resonant source element is configured to resonate with an oscillating current at a second resonant frequency in response to excitation from the first periodically fluctuating electromagnetic near field generated by the first source conductor. A first resonant load element is spaced apart from the first resonant source element and the second resonant source element and is configured to resonate at the first resonant frequency with an oscillating current in response to excitation from the first resonant source element. The first resonant load element is configured to generate a periodically fluctuating electromagnetic near field when resonating with the second oscillating current. At least one second resonant load element is spaced apart from the first resonant source element and the second resonant source element and is configured to resonate at the second resonant frequency with an oscillating current in response to excitation from the second resonant source element. The second resonant load element is configured to generate a periodically fluctuating electromagnetic near field when resonating with the oscillating current. A first load conductor is electromagnetically coupled to the first resonant load element and the second resonant load element. The first load element is configured to generate a first current applied to a first load in response to resonance in the first resonant load element and the second resonant load element.

In another aspect, the invention is a wireless power transmission device for transmitting power from at least one power source to at least one load. A first source conductor is configured to generate a first periodically fluctuating electromagnetic near field in response to an alternating current received from the power source. A first resonant source element has a first resonant frequency and that has a Q factor that is at a maximum at the first resonant frequency. The first resonant source element is configured to resonate with an oscillating current at the first resonant frequency in response to excitation from the first periodically fluctuating electromagnetic near field generated by the first source conductor. At least one second resonant source element has a second resonant frequency that is different from the first resonant frequency and has a Q factor that is at a maximum at the second resonant frequency. The second resonant source element is configured to resonate with an oscillating current at the second resonant frequency in response to excitation from the first periodically fluctuating electromagnetic near field generated by the first source conductor. A first resonant load element is spaced apart from the first resonant source element and the second resonant source element and is configured to resonate at the first resonant frequency with an oscillating current in response to excitation from the first resonant source element. The first resonant load element is configured to generate a periodically fluctuating electromagnetic near field when resonating with the second oscillating current. At least one second resonant load element that is spaced apart from the first resonant source element and the second resonant source element and that is configured to resonate at the second resonant frequency with an oscillating current in response to excitation from the second resonant source element. The second resonant load element is configured to generate a periodically fluctuating electromagnetic near field when resonating with the oscillating current. A first load conductor is electromagnetically coupled to the first resonant load element and the second resonant load element, and is configured to generate a first current applied to a first load in response to resonance in the first resonant load element and the second resonant load element.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
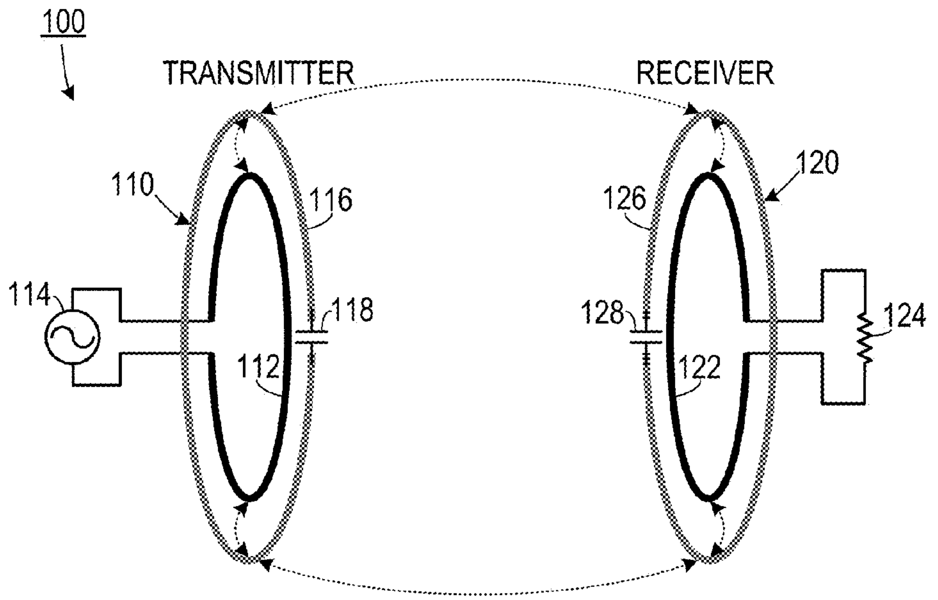
FIG. 1 is a schematic diagram of one embodiment of a wireless power transfer system.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein "Q factor" means the quality factor associated with a resonant circuit.

As shown in FIG. 1, one embodiment of a wireless power transmission system 100 includes a source unit 110 (transmitter unit, or TX) and a load unit 120 (receiver unit, or RX). The source unit 110 includes a planar source conductor 112 that generates a first periodically fluctuating electromagnetic near field in response to an alternating current received from the power source 114. A planar resonant source element 116 that is coplanar with the planar source conductor 112. The planar resonant source element 116 has a Q factor that is at a maximum at its resonant frequency. In one embodiment, the planar resonant source element 116 includes an inductive loop having a first end and a different second end with a capacitor 118 that couples the first end to the second end. The planar resonant source element 116 resonates with a first oscillating current at the first resonant frequency in response to excitation from the periodically fluctuating electromagnetic near field generated by the planar source conductor 112. The load unit 120 includes a planar resonant load element 126 that is spaced apart from the planar resonant source element 116 and that is preferably aligned therewith. The planar resonant load element 126 is configured to resonate at the first resonant frequency with a second oscillating current in response to excitation from the planar resonant source element 116. The planar resonant load element 126 generates a second periodically fluctuating electromagnetic near field when resonating with the second oscillating current. In one embodiment, the planar resonant load element 126 includes an inductive loop having a first end and a different second end and a capacitor 128 that couples the first end to the second end. A planar load conductor 122 is electromagnetically coupled to and coplanar with the planar resonant load element 126 and generates a current in response to the second periodically fluctuating electromagnetic near field, which is applied to a load 124. The elements are typically made from conductive wires (such as copper) or conductive ink.

Figure 2A:
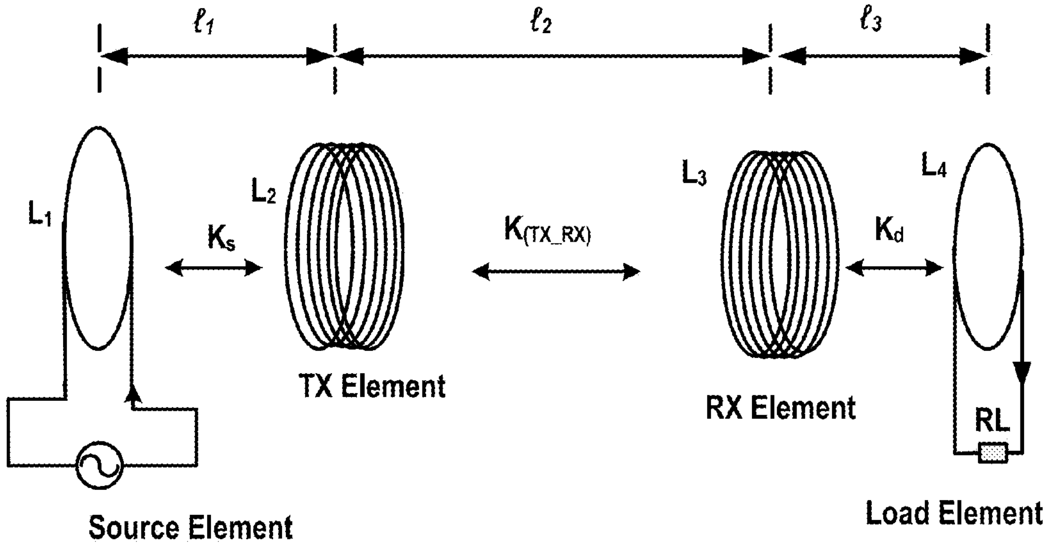
FIG. 2A is a schematic diagram of a model SCMR power transfer system in air.
Figure 2B:
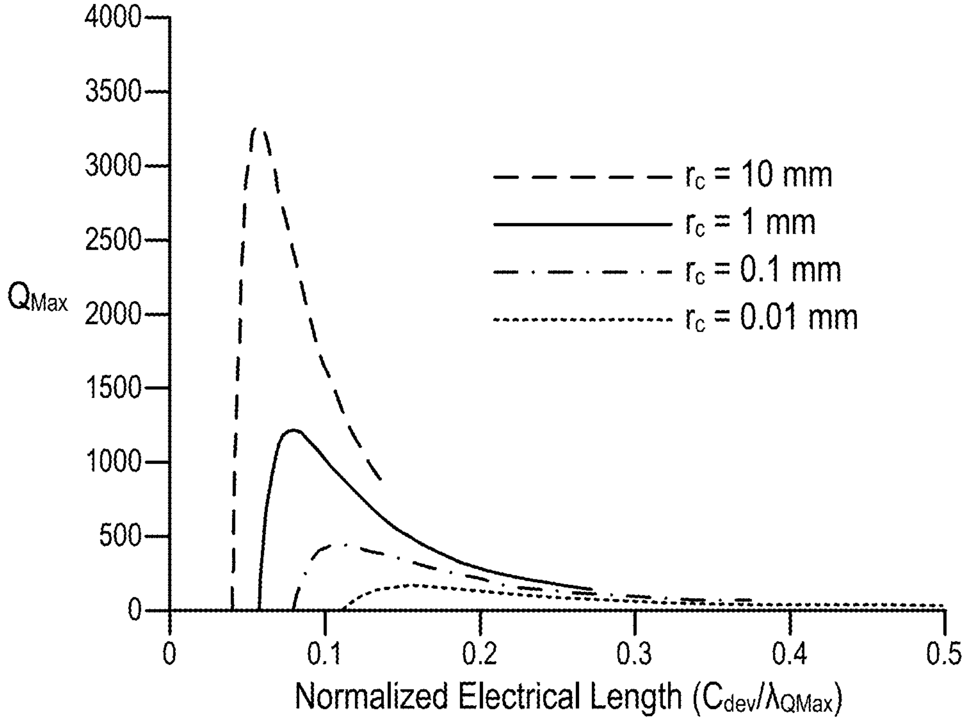
FIG. 2B is a graph demonstrating the relationship between $Q_{max}$ and the electrical length of the helix.
Figure 2C:
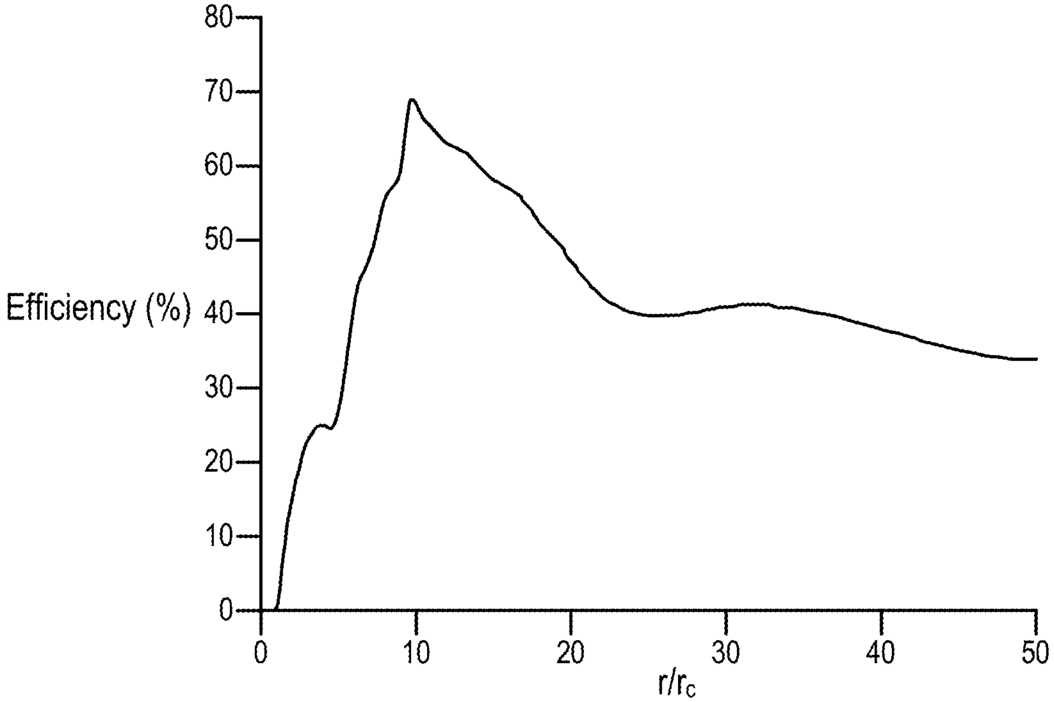
FIG. 2C is a graph demonstrating the efficiency of SCMR systems with different $r/r_c$ ratios.

In one embodiment, the invention employs a wireless powering system based on a strongly coupled magnetic resonance (SCMR) method, which is discussed theoretically in FIGS. 2A-2C. The SCMR method is a non-radiative wireless mid-range power transfer method, which in one embodiment is effective for transferring power across a distance of between 10 cm to 300 cm. SCMR can provide wireless power transfer efficiencies that are significantly higher than the efficiencies of conventional inductive coupling methods. To achieve high efficiency, the transmitting and receiving elements (typically loops or coils) are designed so that they resonate at the desired operational frequency that coincides with the frequency of where the elements exhibit maximum Q-factor.

SCMR systems use resonant transmitters and receivers that are strongly coupled. Strongly coupled systems are able to transfer energy efficiently, because resonant objects exchange energy efficiently versus non-resonant objects that only interact weakly. A standard SCMR system consists of four elements (typically four loops or two loops and two coils) as shown in FIG. 2A.

The source element is connected to the power source, and it is inductively coupled to the TX element. The TX element exhibits a resonant frequency that coincides with the frequency, where its Q-factor is naturally at a maximum. Similarly, the RX exhibits a resonant frequency that coincides with the frequency where its Q-factor is naturally at a maximum. Furthermore, the load element is terminated to a load. The analysis that follows assumes that the entire system operates in air. Also, SCMR requires that the TX and RX elements are resonant at the same frequency in order to achieve efficient wireless power transfer.

The analysis that follows employs TX and RX elements that have an arbitrary number of helical loops. However, in the simple embodiment shown above, only a single loop is used. The TX and RX elements can be equivalently represented by a series RLC circuit. Helices are often preferred as TX and RX SCMR elements because they exhibit both distributed inductance and capacitance and therefore, they can be designed to self-tune to a desired resonant frequency, $f_r$, without the need of external capacitors. Also, external capacitors have losses, which in practice can reduce the Q-factor of the TX and RX elements and in turn decrease the efficiency of SCMR systems. Based on the equivalent RLC circuit of an SCMR system, its resonant frequency, $f_r$, can be calculated, by following equation:

$$f_r = \frac{1}{2\pi\sqrt{LC}} \tag{1}$$

The resonant frequency, $f_r$ is also the operational frequency for the SCMR wireless powering system. The Q-factor of a resonant RLC circuit is given by:

$$Q = \frac{\omega_r L}{R} = \frac{2\pi f_r L}{R} \tag{2}$$

Therefore, the Q-factor of a resonant helix (i.e., self resonant) can be written as:

$$Q = \frac{2\pi f_r L_{helix}}{R_{ohm} + R_{rad}} \tag{3}$$

where L, $R_{rad}$, and $R_{ohm}$ are the self-inductance, radiation resistance and ohmic resistance of the helix, which is for a short helix or solenoid (2r>h) are given by:

$$L_{helix} = \mu_o r N^2\left[\ln\left(\frac{8r}{r_c}\right) - 2\right] \tag{4}$$

$$R_{rad}(\pi/6)\eta_o N^2(2\pi f_r r/c)^4 \tag{5}$$

$$R_{ohm(helix)} = \left(\sqrt{\mu_o \rho \pi f_r}\right) N r / r_c \tag{6}$$

where μ is the permeability of free space, ρ is the helix's material resistivity, r is the radius of the helix, $r_c$ is the cross sectional wire radius, N is the number of turns (the simple single turn embodiment above uses N=1), f is the frequency, $\eta_o$ is the impedance of free space and c is the speed of light, h is the height of the helix. It should also be noted that equations (3)-(6) are valid only when $r<\lambda/6\pi$.

SCMR requires that both RX and TX helices also exhibit maximum Q-factor at their resonant frequency $f_r$, in order to achieve maximum wireless power efficiency. This can also be seen by the equation for describing the efficiency of an SCMR system derived in at it operation frequency $f_r$ as follows:

$$\eta(f_r) = \frac{k^2_{(TX\_RX)}(f_r)Q_{TX}(f_r)Q_{RX}(f_r)}{1 + k^2_{(TX\_RX)}(f_r)Q_{TX}(f_r)Q_{RX}(f_r)} \tag{7}$$

where $K_{TX\_RX}$ is the mutual coupling between the RX and TX helices and where $Q_{TX}$ and $Q_{RX}$ are the Q-factors of the RX and TX helices, respectively. If the TX and RX helices are identical, then their Q-factors are equal i.e., $Q_{TX}=Q_{RX}=Q$; therefore equation (7) can be written as:

$$\eta(f_r) = \frac{k^2_{(TX\_RX)}(f)Q^2_{TX}(f_r)}{1 + k^2_{(TX\_RX)}(f_r)Q^2_{TX}(f_r)} \tag{8}$$

Equation (8) shows that in order to maximize the efficiency of an SMCR system, the operation frequency $f_r$ must be equal to the frequency $f_{max}$, where the Q-factor is maximum. In what follows, the maximum Q-factor of a resonant helix is derived. The Q-factor of a resonant helix can be expressed in terms of its geometrical parameters using (3)-(6) as:

$$Q(f_r, r, r_c, N) = \frac{2\pi f_r \mu_0 r N^2\left[\ln\left(\frac{8r}{r_c}\right) - 2\right]}{\left(\frac{\mu_0 \rho \pi f_r r^2 N}{r_c^2}\right)^{\frac{1}{2}} + 20\pi^2 N^2\left(\frac{2\pi f_r r}{c}\right)^4} \tag{9}$$

The maximum Q-factor, $Q_{max}$ and the frequency, $f_{max}$, where $Q_{max}$ occurs, can be derived from (9) using calculus as:

$$f_{max}(r, r_c, N) = \frac{c^{8/7}\mu^{1/7}\rho^{1/7}}{4\cdot 15^{2/7} N^{2/7} r_c^{2/7} \pi^{11/7} r^{6/7}} \tag{10}$$

-continued $$Q_{max}(r, r_c, N) = \frac{2\pi f_{max}\mu_0 r N^2\left[\ln\left(\frac{8r}{r_c}\right) - 2\right]}{\left(\frac{\mu_0\rho\pi r^2 f_{max} N}{r_c^2}\right)^{\frac{1}{2}} + 20\pi^2 N^2\left(\frac{2\pi f_{max} r}{c}\right)^4} \tag{11}$$

Based on the above discussion, an SCMR system requires that $$f_r = f_{max} \tag{12}$$

which can be written based on (10) as:

$$f_r(r, r_c, N) = \frac{c^{8/7}\mu^{1/7}\rho^{1/7}}{4\cdot 15^{2/7}N^{2/7}r_c^{2/7}\pi^{11/7}r^{6/7}} \tag{13}$$

Therefore, (13) shows that the geometrical parameters of a helix can be appropriately chosen so that the helix has maximum Q-factor at a chosen frequency, $f_r$. For example, if the parameters $f_r$, $r_c$, N and ρ are specified by a designer, (13) can be solved for the radius of the maximum Q-factor, $r_{max}$, as follows:

$$r_{max} = \left[\frac{c^{8/7}\mu^{1/7}\rho^{1/7}}{4\cdot 15^{2/7}r_c^{2/7}N^{2/7}\pi^{11/7}f_r}\right]^{7/6} \tag{14}$$

Next, the helices are analyzed using (10), (11) and (14) to study the behavior of the maximum Q-factor, $Q_{max}$, versus the electrical length of the helix ($c_{dev}/\lambda_{Q_{max}}$) at $f_{max}$, which can be written as:

$$\frac{C_{dev}}{\lambda_{max}} = \frac{2\pi r_{max}}{\lambda_{max}} = \frac{2\pi r_{max} f_{max}}{c} \tag{15}$$

where $L_{dev}$ is the length of the helix (device), $\lambda_{max}$ is the wavelength corresponding to $f_{max}$ given by (10). Specifically, optimum SCMR loops with N=1 are designed in the frequency range 100 KHz≤f≤5 GHz for four values of the cross-sectional radius, $r_c$=0.01, 0.1, 1.0 and 10 mm. The material of the helices is assumed copper and for each pair of $f_{max}$ and $r_c$, the optimum r is calculated by (14). Then $Q_{max}$ from (11) is plotted in FIG. 2B versus the electrical length of the helices ($C_{dev}/\lambda_{Q_{max}}$), which is calculated by (15). Specifically, FIG. 2B illustrates that for each pair of $f_{max}$ and $r_c$ there is an $r_{max}$ that provides the global maximum for the Q-factor, $Q_{Gmax}$.

In what follows the global maximum Q-factor of the helix, $Q_{Gmax}$, is formulated. First, the local maximum O-factor, $Q_{Lmax}$, is derived by substituting (10) into (11):

$$Q_{Lmax} = \frac{2\cdot 3^{6/7}r_c^{6/7}c^{8/7}\mu^{8/7}N^{6/7}\rho^{1/7}\left[\ln\left(\frac{8r}{r_c}\right) - 2\right]}{5^{1/7}\pi^{2/7}r^{3/7}\left[c^{4/7}\mu^{4/7}\rho^{4/7} + 6r_c^{1/7}N^{1/7}r^{3/7}\sqrt{\frac{c^{8/7}\mu^{8/7}\rho^{8/7}}{r_c^{2/7}N^{2/7}r^{6/7}}}\right]} \tag{16}$$

Using again calculus, we can find out that the global maximum for the Q-factor occurs when:

$$\frac{r_{(Gmax)}}{r_c} = \frac{e^{13/3}}{8} \approx 9.52 \tag{17}$$

This result shows that the ratio between the helix radius, r, and the cross-sectional radius, $r_c$, must be approximately 9.52 in order to achieve the maximum Q-factor. This ratio is also independent of frequency and material.

Also, by substituting (17) into (16) we can write the global maximum for the Q-factor as:

$$Q_{Gmax} = \frac{28\cdot 2^{2/7}r_c^{3/7}c^{8/7}\mu^{8/7}N^{6/7}\rho^{1/7}}{15^{1/7}e^{137/7}\pi^{2/7}\left[c^{4/7}\mu^{4/7}\rho^{4/7} + 6r_c^{1/7}N^{1/7}r^{3/7}\sqrt{\frac{c^{8/7}\mu^{8/7}\rho^{8/7}}{r_c^{8/7}N^{2/7}}}\right]} \tag{18}$$

Therefore, if a helix is designed to operate at the global maximum Q-factor it will yield the maximum possible wireless efficiency for the corresponding SCMR system. In order to verify the global maximum design of (17), we assume that an arbitrary ratio of $r/r_c$=t, and solve (13) and (17) to obtain the r and $r_c$ given the number of turns, N, and the desired frequency of operation, $f_o$:

$$r_{c_{max}} = \frac{c\mu^{1/8}\rho^{1/8}}{2\cdot 2^{3/4}\cdot 15^{1/4}N^{1/4}f_o^{7/8}\pi^{11/8}t^{3/4}} \tag{19}$$

$$r_{max} = \frac{c\mu^{1/8}\rho^{1/8}t^{1/4}}{2\cdot 2^{3/4}\cdot 15^{1/4}N^{1/4}f_o^{7/8}\pi^{11/8}} \tag{20}$$

Based on (19) and (20), SCMR systems were designed and simulated in Ansoft HFSS for different ratios $r/r_c$ (2≤t≤50) and assuming the number of turns, N=5, distances, $l_1$=$l_3$=2 cm, $l_2$=10 cm (see FIG. 2A), and operational frequency, $f_o$=46.5 MHz. The efficiency of these designs is compared in FIG. 2C. The results clearly illustrate that the maximum efficiency is achieved for a ratio of t=9.52 that matches our derived global maximum condition of (17).

The following are guidelines for designing helical TX and RX elements of SCMR wireless powering systems. An SCMR system based on helices will not be optimal unless the spacing, s, is picked so that the helices exhibit the appropriate capacitance in order to resonate at the desired operating frequency of the system. The spacing, s of an SCMR helix is an important parameter that should be picked to ensure optimal wireless power transfer efficiency. The capacitance formula for closely wound helix is as follows:

$$C_t = \frac{2\pi^2 r\varepsilon_0}{\ln\left[s/2r_c + \sqrt{(s/2r_c)^2 - 1}\right]} \tag{21}$$

where r is the radius of the helix, $r_c$ is the cross sectional wire radius, $\epsilon_0$ is the permittivity of free space, s is the spacing between adjacent turns of the helix, $C_t$ is the total distributed capacitance of the helix, and t is the thickness of the insulation coating.

The capacitance formula of (21) is valid when $s/2r_c$≤2 and t<<s−$2r_c$. In order to resonate the helix at a desired fre quency f, the spacing between two adjacent turns, s, can be adjusted to provide the required capacitance calculated from (1) as:

$$C_t = \frac{1}{4\pi^2 f^2 L_{helix}} \tag{22}$$

Then equation (21) can be solved for the spacing, s, as follows:

$$S = \frac{\left[e^{\left(\frac{4\pi^4 r^2 \varepsilon_0^2}{C_t^2}\right)} + 1\right] r_c}{e^{\left(\frac{2\pi^2 r \varepsilon_0}{C_t}\right)}} \tag{23}$$

Equation (23) is valid when $s/2r_c \leq 2$ and $t \ll s-2r_c$. Therefore, the spacing, s, can be adjusted using (23) independently from the other geometrical parameters to achieve the necessary capacitance and without affecting the frequency where a short helix or solenoid (2r>h) exhibits maximum Q-factor since (13) shows that the $f_{max}$ does not depend on s.

Figure 3:
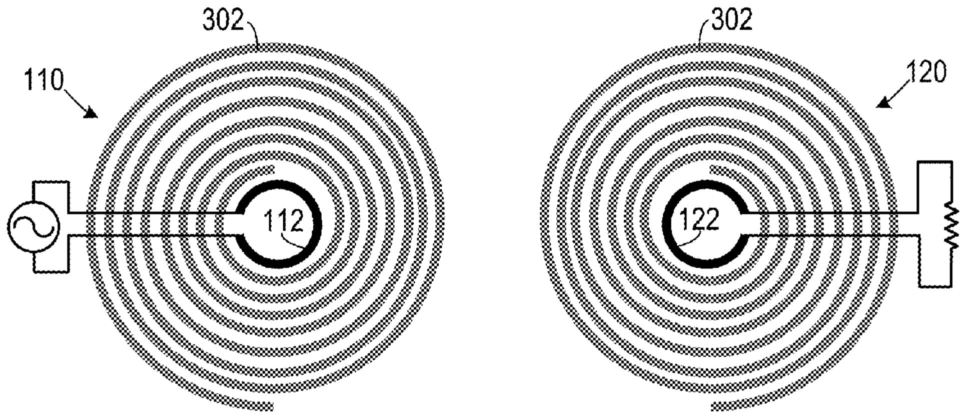
FIG. 3 is a schematic diagram of an embodiment of a wireless power transfer system employing spiral resonant elements.
Figure 4:
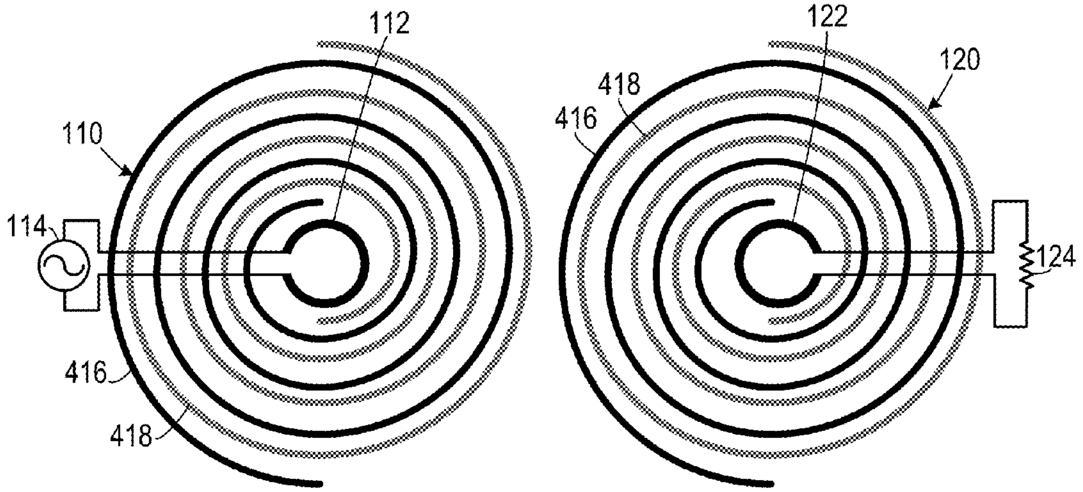
FIG. 4 is a schematic diagram of an embodiment of a wireless power transfer system employing bifilar spiral resonant elements.

As shown in FIG. 3, the planar resonant source element 110 and the planar resonant load element 120 could each be a conductive spiral 302, which could be in the form of a conductive material that has been printed on a planar substrate. In such an embodiment, the spirals 302 have an inherent capacitance and the design of the spiral is chosen so that each spiral resonator 302 resonates at the frequency where the loop naturally exhibits its maximum Q-factor. Given the complexity of the capacitance associated with the spirals 302, their design would typically be accomplished through simulation. Similarly, as shown in FIG. 4, the planar resonant source element 110 and the planar resonant load element 120 could each include two coplanar conductive bifilar spirals 416 and 418. Because such spirals are self-resonant, they would not exhibit the same sort of capacitor loss associated with embodiments in which a capacitor is added to a conductive loop.

Figure 5:
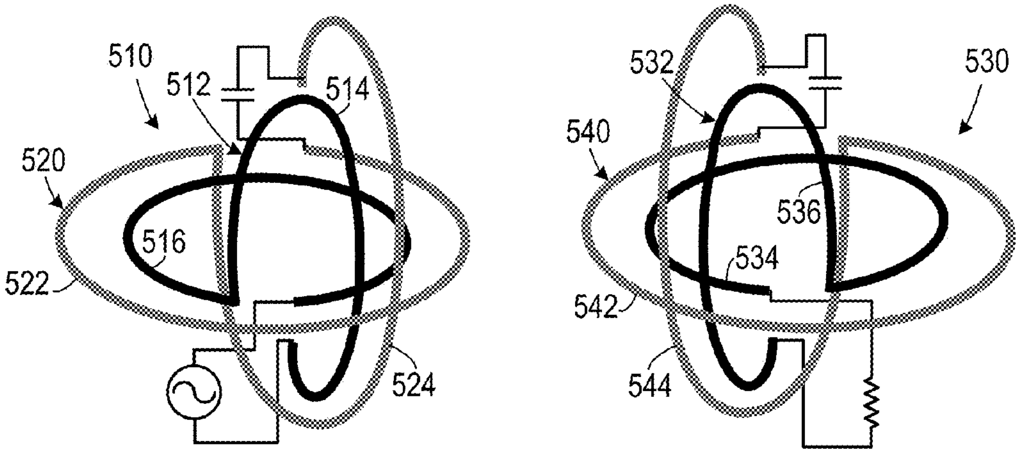
FIG. 5 is a schematic diagram of an embodiment of a wireless power transfer system employing three-dimensional elements.
Figure 10A:
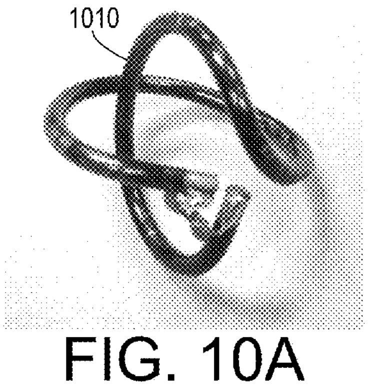
FIGS. 10A-10C are photographs of one experimental embodiment.
Figure 10B:
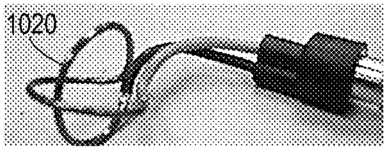
Figure 10C:
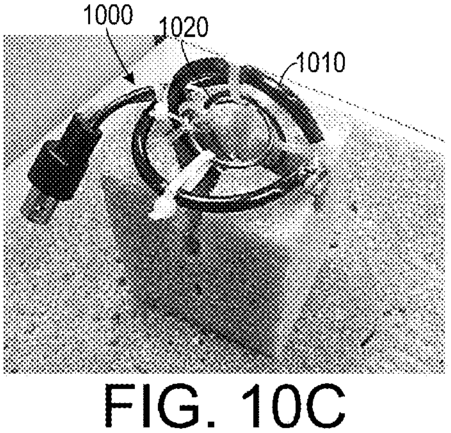

One embodiment, as shown in FIG. 5, maintains efficiency even when the source unit 510 and the load unit 530 are not in alignment through the use of a three dimensional symmetric source unit 510 and load unit 530. In this embodiment, the source element 512 includes a first loop 514 and an electrically contiguous second loop 516 that is orthogonal to the first loop 514. Similarly, the first resonator unit 520 includes a first loop 522 and an orthogonal second loop 524. The source unit 512 is disposed inside the first resonator unit 520. The receiver unit 530 is configured similarly, having a load element 532 with a first loop 534 and a second orthogonal loop 536, and having a second resonator element 540 with a first loop 542 and an orthogonal second loop 544. More complex structures may be employed and as the spherical symmetry of the resonators increases, the effect of misalignment also decreases. A photograph of an experimental embodiment of a resonator element 1010 according to this embodiment is shown in FIG. 10A, a source element 1020 is shown in FIG. 10B and an assembled source unit 1000 is shown in FIG. 10C.

Figure 6A:
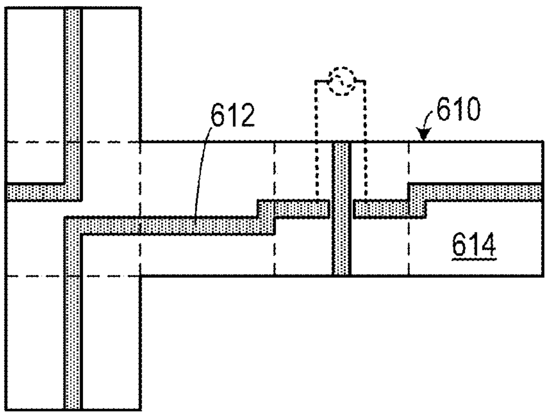
FIGS. 6A-6C are schematic diagrams showing an embodiment of a wireless power transfer system employing three-dimensional elements formed by folding a flat sheet on which conductors are printed.
Figure 6B:
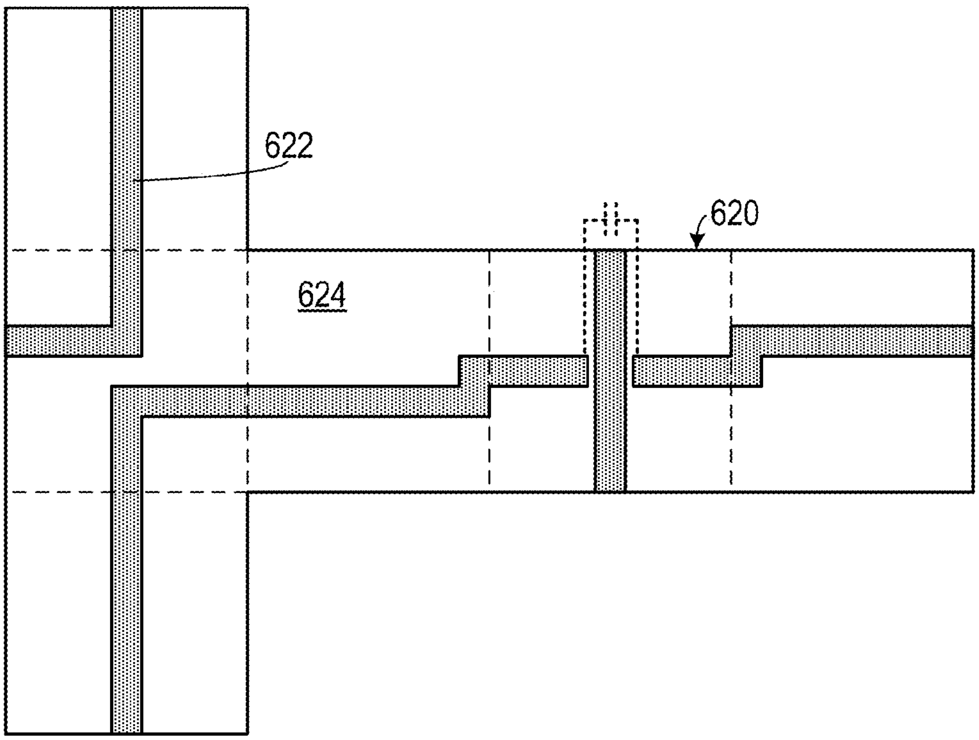
Figure 6C:
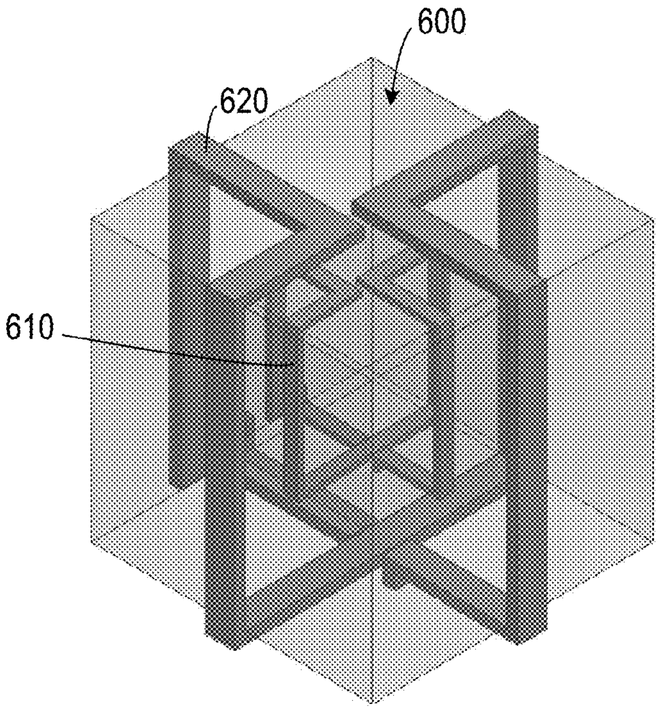

One approach to making such a three-dimensional structure is shown in FIGS. 6A-6C. In this embodiment a conductive ink 612 (such as a metallic ink) is printed on a non-conductive substrate 614 (such as a plastic or a paper) to form the conductive elements of the source element 610, as shown in FIG. 6A. Similarly, as shown in FIG. 6B, a conductive ink 622 is printed on a non-conductive substrate 624 to form the conductive elements of the first resonator element 620. These shapes are then folded into cubes to form the source unit 600. A similar process can be employed to form the load unit (not shown). Also, conductive ink can be printed directly onto a three dimensional object (such as the interior of the casing of a cellular telephone, etc.) to form the load unit and the first resonator unit.

Figure 7A:
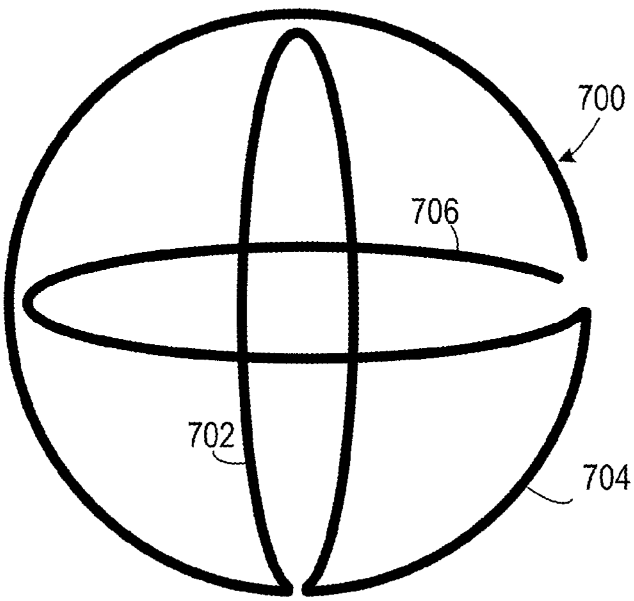
FIGS. 7A-7B are schematic drawings of an embodiment in which each element employs three orthogonal loops.
Figure 7B:
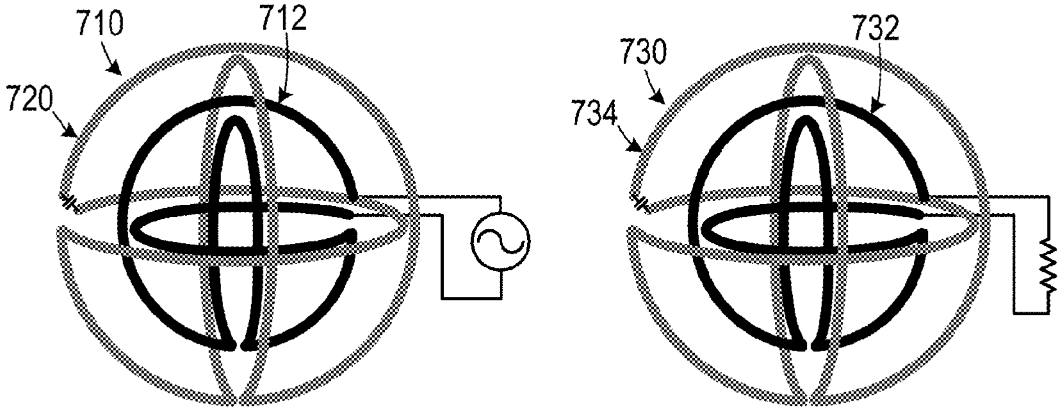
Figure 11:
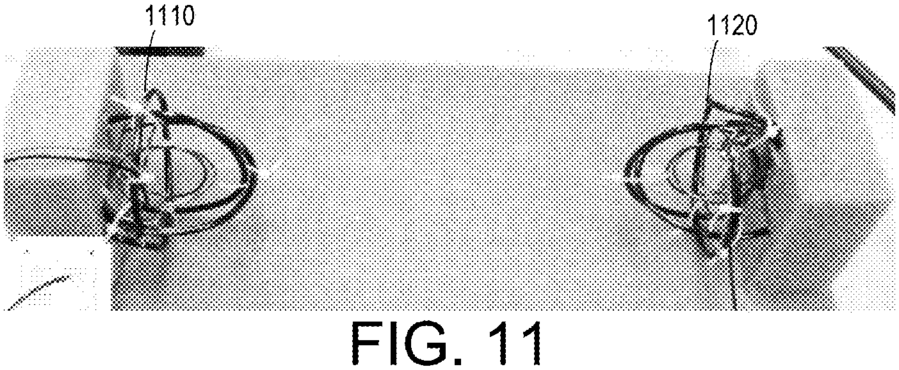
FIG. 11 is a photograph of a second experimental embodiment.

As shown in FIGS. 7A-7B, the inefficiency resulting from a load unit 730 being misaligned with a source unit 710 can be reduced by increasing the spherical symmetry of each unit. One way in which this can be accomplished, as shown in FIG. 7A, is to use conductive elements 700 (i.e., source, first resonating, second resonating and load) that include a first loop 702, an electrically contiguous second loop 704 and an electrically contiguous third loop 706. In this embodiment, each loop is substantially planar and is substantially orthogonal to the other two loops. As shown in FIG. 7B, one embodiment employs a source unit 710 with a three orthogonal loop source element 712 disposed inside of a first three orthogonal loop resonator element 720, and a load unit 730 with a three orthogonal loop load element 732 disposed inside of a second three orthogonal loop resonator element 734. A photograph of one experimental embodiment of a source unit 1110 and a load unit 1120 employing elements with three orthogonal loops is shown in FIG. 11. As will be appreciated by those of skill in the art, three dimensional structures of greater complexity can increase the spherical symmetry of the elements, thereby reducing inefficiency caused by misalignment of the units.

Figure 8A:
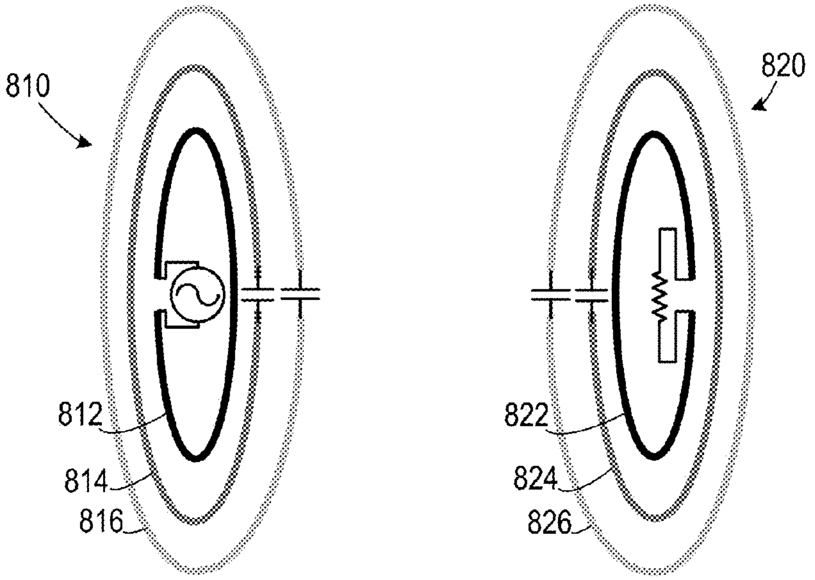
FIG. 8A is a schematic diagram of a wireless power transfer system employing multiple resonator elements.
Figure 8B:
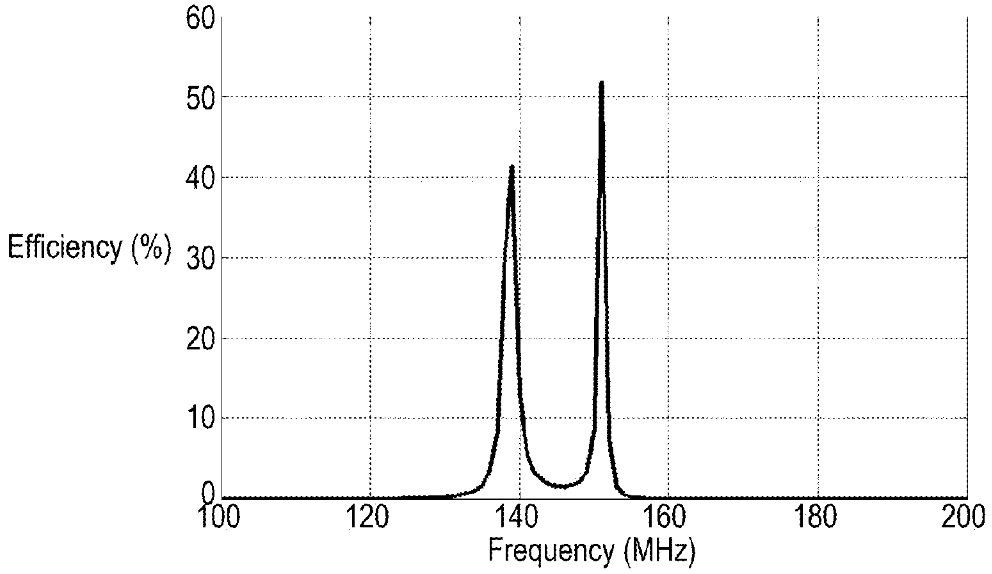
FIG. 8B is a graph relating efficiency to frequency in the embodiment shown in FIG. 7A.

In other embodiments, multiple source and resonator elements can be employed to tune the system to more than one different frequency. Such embodiments can facilitate, for example, the transfer of both power and data from the source to the load. This ability may be useful in such situations as when it is desirable to charge a cell phone (or other type of digital device, such as a tablet) which updating some of the data stored on the device. For example, one embodiment, as shown in FIGS. 8A-8B, includes a source unit 810 with a source element 812 and two separate resonator elements: a first source resonator element 814 and a second source resonator element 816. Similarly, the load unit 820 includes a load element 822 and two resonator elements: a first load resonator element 824 that has substantially the same resonant frequency as the first source resonator element 814, and a second load resonator element 826 that has substantially the same resonant frequency as the second source resonator element 816. Use of multiple resonator elements allows the system to be tuned to multiple specific frequencies. Efficiency as a function of frequency is shown in FIG. 8B for an embodiment in which the distance between the units was 7 cm, the radii of the source loop 812 and the load loop 822 were 1.5 cm, the radii of the a first source resonator element 814 and the first load resonator element 824 were 2.2 cm, the radii of the second source resonator element 816 and the second load resonator element 826 and the cross-sectional radius of the wires used in each element was 2.2 mm. As can be seen, efficiency peaks at two distinct frequencies with this embodiment.

In one embodiment, a data signal can be modulated onto a power signal. By controlling the bandwidth of the system, various modulation schemes may be employed.

Figure 9A:
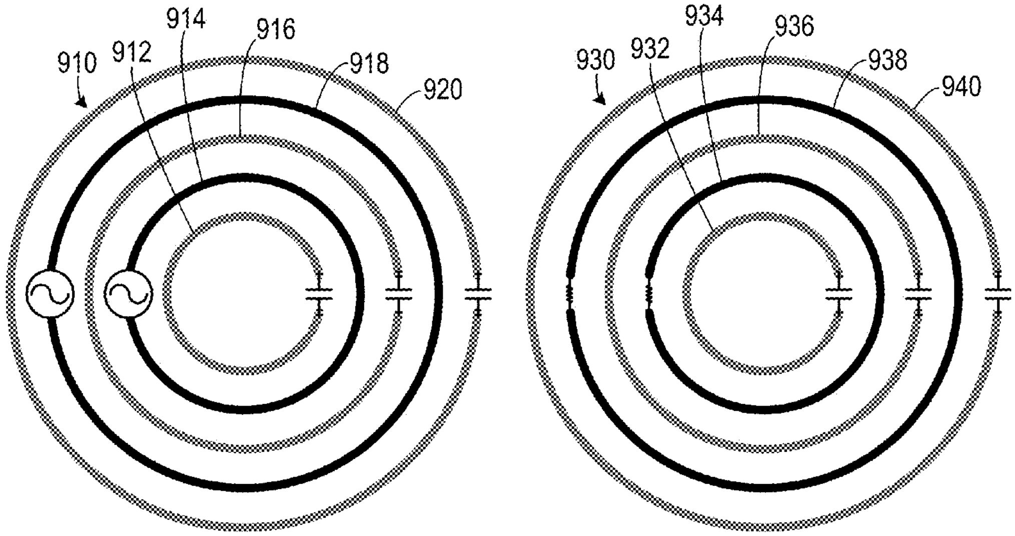
FIG. 9A is a schematic diagram of a wireless power transfer system employing multiple resonator elements and multiple source/load elements.
Figure 9B:
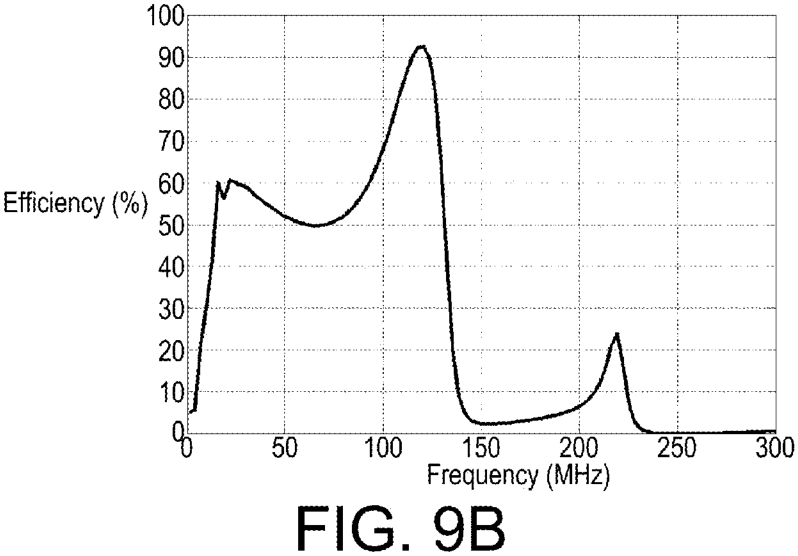
FIG. 9B is a graph relating efficiency to frequency in the embodiment shown in FIG. 8A.

In another embodiment, as shown in FIGS. 9A and 9B, the source unit 910 can include two different source elements 914 and 918 and three different source resonator elements 912, 916 and 920. Similarly, the load unit 930 includes two load elements 934 and 938 and three different load resonator elements 932, 936 and 940. As shown in FIG. 9B, an experimental embodiment using this configuration resulted in a more complex efficiency versus frequency graph. This embodiment allows for control over the bandwidth of the system, which facilitates transfer of signals (such as digital signals) during a power transfer event. In one example, one frequency can be used for power transmission and another frequency can be used for data transmission. This experimental embodiment employed the following parameters: distance=10 cm; first source/load loops radius=4.7 cm; second source/load loop2 radius=8.5 cm; first TX & RX resonator loops radius=2.2 cm; second TX & RX resonator loops radius=6.5 cm; third TX & RX resonator loops radius=11.5 cm; and wire cross-sectional radius=2.2 mm. Many other combinations of source/load elements and resonator elements are possible.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A wireless power transmission system for transmitting power from at least one power source to at least one load, comprising:

(a) a first source conductor configured to generate a first periodically fluctuating electromagnetic near field in response to an alternating current received from the power source;

(b) a first resonant source element, spaced apart from the first source conductor, that is configured to resonate with an oscillating current at a first resonant frequency in response to excitation from the first periodically fluctuating electromagnetic near field generated by the first source conductor;

(c) at least one second resonant source element, spaced apart from the first source conductor and the first resonant source element, that is configured to resonate with an oscillating current at a second resonant frequency, different from the first resonant frequency, in response to excitation from the first periodically fluctuating electromagnetic near field generated by the first source conductor;

(d) a first resonant load element that is spaced apart from the first resonant source element and the second resonant source element and that is configured to resonate at the first resonant frequency with an oscillating current in response to excitation from the first resonant source element, the first resonant load element configured to generate a periodically fluctuating electromagnetic near field when resonating with the second oscillating current;

(e) at least one second resonant load element that is spaced apart from the first resonant source element and the second resonant source element, that is also spaced apart from the first resonant load element, and that is configured to resonate at the second resonant frequency with an oscillating current in response to excitation from the second resonant source element, the second resonant load element configured to generate a periodically fluctuating electromagnetic near field when resonating with the oscillating current; and (f) a first load conductor that is electromagnetically coupled to the first resonant load element and the second resonant load element, but also spaced apart from the first resonant load element and the second resonant load element, and that is configured to generate a first current applied to a first load in response to resonance in the first resonant load element and the second resonant load element.

2. The wireless power transmission system of claim 1, wherein the first resonant source element has a Q factor that is at a maximum at the first resonant frequency and wherein the first resonant load element has a Q factor that is at a maximum at the first resonant frequency.

3. The wireless power transmission system of claim 1, wherein the second resonant source element has a Q factor that is at a maximum at the second resonant frequency and wherein the second resonant load element has a Q factor that is at a maximum at the second resonant frequency.

4. The wireless power transmission system of claim 1, wherein the first source conductor, the first resonant source element and the second resonant source element are all disposed on a first plane and wherein the first load conductor, the first resonant load element and the second resonant load element are all disposed on a second plane that is different from and parallel to the first plane.

5. The wireless power transmission system of claim 4, wherein the first resonant source element is aligned with the first resonant load element and wherein the second resonant source element is aligned with the second resonant load element.

6. The wireless power transmission system of claim 1, further comprising:

(a) at least one second source conductor configured to generate a second periodically fluctuating electromagnetic near field in response to an alternating current received from the power source; and (b) at least one second load conductor that is electromagnetically coupled to the first resonant load element and the second resonant load element, and that is configured to generate a second current applied to a second load in response to resonance in at least one of the first resonant load element and the second resonant load element.

7. The wireless power transmission system of claim 6, wherein the first source conductor is configured to transmit a power signal to the first load conductor and wherein the second source conductor is configured to transmit a power signal to the second load conductor.

8. The wireless power transmission system of claim 1, wherein the first resonant source element and the second resonant source element each comprises:

(a) an inductive loop having a first end and a different second end; and (b) a capacitor that is coupled to the first end and to the second end.

9. The wireless power transmission system of claim 1, wherein the first resonant load element and the second resonant load element each comprises:

(a) an inductive loop having a first end and a different second end; and (b) a capacitor that is coupled to the first end and to the second end.

10. The wireless power transmission system of claim 1, wherein at least one of the first resonant source element, the second resonant source element, the first resonant load element and the second resonant load element includes a conductive material that has been printed on the planar substrate.

11. A wireless power transmission device for transmitting power from at least one power source to at least one load, comprising:

(a) a first source conductor configured to generate a first periodically fluctuating electromagnetic near field in response to an alternating current received from the power source;

(b) a first resonant source element, that is spaced apart from the first source conductor, that has a first resonant frequency and that has a Q factor that is at a maximum at the first resonant frequency, the first resonant source element configured to resonate with an oscillating current at the first resonant frequency in response to excitation from the first periodically fluctuating electromagnetic near field generated by the first source conductor;

(c) at least one second resonant source element, that is spaced apart from the first source conductor and the first resonant source element, and that has a second resonant frequency, different from the first resonant frequency, and that has a Q factor that is at a maximum at the second resonant frequency, the second resonant source element configured to resonate with an oscillating current at the second resonant frequency in response to excitation from the first periodically fluctuating electromagnetic near field generated by the first source conductor;

(d) a first resonant load element that is spaced apart from the first resonant source element and the second resonant source element and that is configured to resonate at the first resonant frequency with an oscillating current in response to excitation from the first resonant source element, the first resonant load element configured to generate a periodically fluctuating electromagnetic near field when resonating with the second oscillating current;

(e) at least one second resonant load element that is spaced apart from the first resonant source element and the second resonant source element, and that is spaced apart from the first resonant load element, and that is configured to resonate at the second resonant frequency with an oscillating current in response to excitation from the second resonant source element, the second resonant load element configured to generate a periodically fluctuating electromagnetic near field when resonating with the oscillating current; and (f) a first load conductor that is electromagnetically coupled to the first resonant load element and the second resonant load element, and that is spaced apart from the first resonant load element and from the second resonant load element, and that is configured to generate a first current applied to a first load in response to resonance in the first resonant load element and the second resonant load element.

12. The wireless power transmission device of claim 11, further comprising:

(a) at least one second source conductor configured to generate a second fluctuating electromagnetic near field in response to an alternating current received from the power source; and (b) at least one second load conductor that is electromagnetically coupled to the first resonant load element and the second resonant load element, and that is configured to generate a second current applied to a second load in response to resonance in the first resonant load element and the second resonant load element.

13. The wireless power transmission device of claim 12, wherein the first source conductor is configured to transmit a first signal to the first load conductor and wherein the second source conductor is configured to transmit a second signal to the second load conductor.

14. The wireless power transmission device of claim 12, wherein the first signal comprises a power signal and wherein the second signal comprises a data signal.

15. The wireless power transmission system of claim 11, wherein the first resonant source element and the second resonant source element each comprises:

(a) an inductive loop having a first end and a different second end; and (b) a capacitor that is coupled to the first end and to the second end.

16. The wireless power transmission system of claim 11, wherein the first resonant load element and the second resonant load element each comprises:

(a) an inductive loop having a first end and a different second end; and (b) a capacitor that is coupled to the first end and to the second end.

17. The wireless power transmission system of claim 11, wherein at least one of the first resonant source element, the second resonant source element, the first resonant load element and the second resonant load element includes a conductive material that has been printed on the planar substrate.

* * * * *